United States Patent [19]

Owens

[11] Patent Number: 5,252,631

[45] Date of Patent: Oct. 12, 1993

[54] METHOD FOR ENHANCED DIELECTRIC CURING

[75] Inventor: John N. Owens, Sterling Heights, Mich.

[73] Assignee: General Motors Corporation, Detroit, Mich.

[21] Appl. No.: 743,626

[22] Filed: Aug. 12, 1991

[51] Int. Cl.$^5$ .......................... C08J 3/28; C08K 3/04; C08K 5/19; C08L 63/02

[52] U.S. Cl. .................................. 523/137; 523/300; 523/400; 523/461

[58] Field of Search ................ 523/137, 300, 461, 400

[56] References Cited

U.S. PATENT DOCUMENTS

| | | | |
|---|---|---|---|
| 3,790,522 | 2/1974 | Bliss | 523/461 |
| 4,284,753 | 8/1981 | Hewitt, Jr. | 528/89 |
| 4,358,577 | 11/1982 | McCrary et al. | 528/89 |
| 4,554,341 | 11/1985 | Allen | 528/89 |
| 4,725,652 | 2/1988 | Bertram et al. | 525/485 |

*Primary Examiner*—John C. Bleutge
*Assistant Examiner*—D. R. Wilson
*Attorney, Agent, or Firm*—Randy W. Tung

[57] ABSTRACT

A heat curable resin composition consists essentially of a thermosetting resin, a curing agent chemically reacting with the resin for curing the resin upon the application of a predetermined amount of heat for a predetermined period of time, and an additive system consisting of a chemically inert salt which is soluble in the resin and carbon blacks for increasing the dielectric loss factor of the composition without a significant increase in viscosity of the composition to accelerate the dielectric heating rate. A method of preparing the heat curable resin composition includes the steps of mixing the thermosetting resin and curing agent which chemically reacts with the resin for curing the resin upon the application of a predetermined amount of heat for a predetermined period of time and mixing an additive system consisting of a chemically inert salt and carbon blacks in the resin and increasing the dielectric loss factor of the composition without a significant increase in viscosity of the composition. The composition is dielectrically heated at an accelerated rate which is faster than the rate of heating the mixture of the resin and curing agent alone.

4 Claims, 2 Drawing Sheets

METHOD FOR ENHANCED DIELECTRIC CURING

FIELD OF THE INVENTION

The present invention relates to heat curable resin compositions. More specifically, the present invention relates to a composition and method for improving the curing of resin used in structural composites, such as epoxy resins by increasing the dielectric loss factor of the resin at radio frequencies.

BACKGROUND OF THE INVENTION

Diamine curing agents are often favored as curatives for epoxy resins used in structural composites. J. N. Owens, "Dielectric Curing of Epoxy Resins: Measurements of Dielectric Properties at Radio Frequencies", G. M. Research Report PO-844, Jun. 4, 1987, the diamine curatives yield resin mixtures with low dielectric loss factors during the cure. On the other hand, processes are presently being employed utilizing a dielectric curing process for the fabrication of structural composites. The use of dielectric curing enables the rapid curing of thick cross sections and thereby reduces cycle times. With conventional heating, the thick cross sections are heated by conduction from the outside surfaces, whereas with dielectric heating, heat is generated within the entire volume of the part. The volumetric heating enables faster heating rates and shorter cure times. However, the low loss factors of the diamine cured epoxy resins make dielectric heating difficult. To take advantage of the dielectric heating process, a resin with high loss factor is desirable.

Carbon blacks are known to increase the dielectric loss factor of epoxy resins, however, most carbon blacks cause a significant increase in resin viscosity, except at very low concentrations. Carbon blacks upwardly shift the entire loss factor curve of the resin but the shape of the curve is unaffected. At very low carbon blacks concentration, the effectiveness of increasing the dielectric loss factor of epoxy resins by the mere addition of carbon blacks is questionable.

In a previously filed patent application by this inventor now U.S. Pat. No. 5,057,554, a method of using a chemically inert salt soluble in a resin for increasing the dielectric loss factor of the composition without significantly increasing the viscosity of the composition was disclosed. Preferably, quaternary ammonium salts are used which have been unexpectedly found to increase the dielectric loss factor of epoxy resins. However, the salts are chemically inert in the resin.

The U.S. Pat. No. 4,554,341 to Allen, issued Nov. 19, 1985, discloses the addition of tetrabutylammonium bromide and similar salts for use as curing accelerator compound in an epoxy composition. The U.S. Pat. Nos. 4,358,577 to McCrary, issued Nov. 9, 1982, 4,284,753 to Hewitt, Jr., issued Aug. 18, 1981, and 4,725,652 to Bertram et al, issued Feb. 16, 1988, all disclose tetrabutylammonium salts for use as curing accelerators. In each of the aforementioned patents, the quaternary ammonium salt additives act as chemical accelerators to the curing reactions. The additives are not inert but rather are chemically active participants in the curing reaction. The quaternary ammonium salts are not inert in the systems and there is absolutely no recognition of the quaternary ammonium salts having the ability to affect dielectric heating. Moreover, none of the aforementioned patents utilize or contemplate the dielectric heating of the chemical compositions per se.

It is, therefore, an object of the present invention to provide a method of increasing the dielectric loss factor of epoxy resins by using an additive system that is more effective than the addition of either carbon blacks or quaternary ammonium salts alone.

It is another object of the present invention to provide a method of increasing the dielectric loss factor of epoxy resins by using an additive system that does not increase the viscosity of the epoxy resins to a significant degree so as to impair their processing characteristics.

SUMMARY OF THE INVENTION

In accordance with the present invention there is provided a heat curable resin composition consisting essentially of a thermosetting resin, a curing agent chemically reacting with resin for curing the resin upon the application of a predetermined amount of heat for a predetermined period of time and an additive system comprising a chemically inert salt soluble in the resin and carbon blacks for increasing the dielectric loss factor of the composition without a significant increase in viscosity of the composition to accelerate the dielectric heating.

The present invention further provides a method of preparing a heat curable resin composition including the steps of mixing a thermosetting resin and a curing agent which chemically reacts with the resin for curing the resin upon the application of a predetermined amount of heat for a predetermined period of time and adding an additive system comprising a chemically inert salt and carbon blacks in the resin and increasing the dielectric loss factor of the composition without a significant increase in viscosity to the composition. The composition is dielectric heat cured at an accelerated rate which is faster than the rate of curing the mixture of the resin and curing agent alone.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
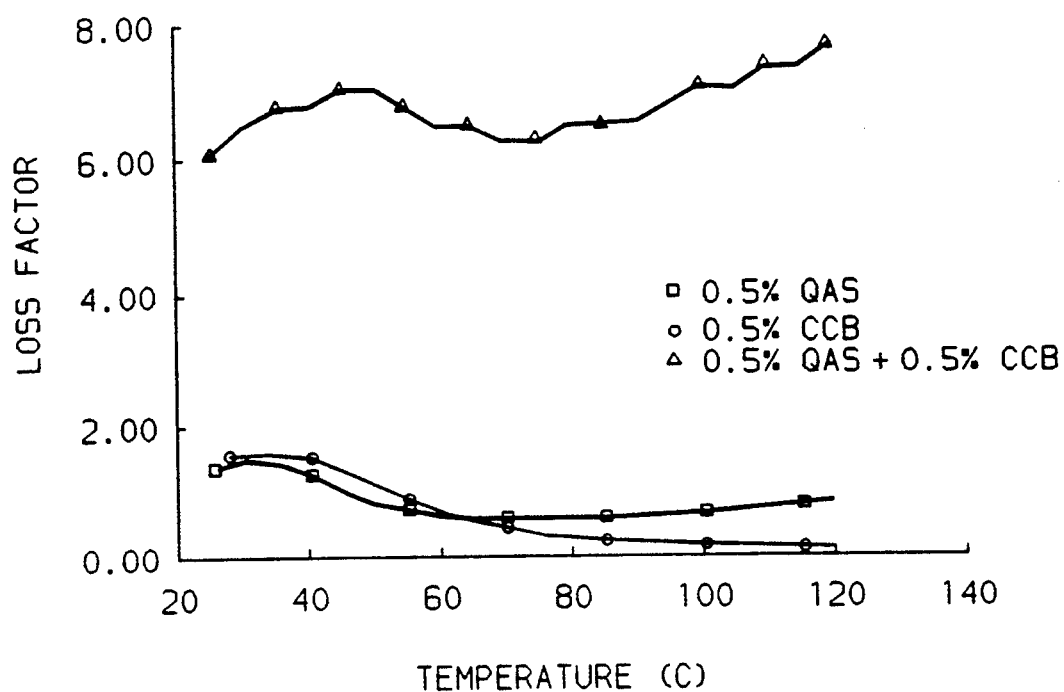
FIG. 1 is a compilation of graphs showing loss factors versus temperature of a diglycidyl ether of bisphenol A (DGEBA) resin with the carbon blacks alone, with the quaternary ammonium salts alone, and with the additive system.

In a manufacturing process involving a filament winding step prior to a compression molding step, i.e., that for a glass fiber reinforced composite leaf spring used in automobiles, the resin viscosity must remain relatively low to make the filament winding process possible. The dielectric loss factor, however, must be high to facilitate the dielectric heating in the compression mold. The addition of my novel additive system containing quaternary ammonium salt and carbon blacks yields a low viscosity epoxy resin with a high dielectric loss factor.

My novel invention provides a heat curable resin composition consisting essentially of a thermosetting resin, a curing agent chemically acting with the resin for curing the resin upon the application of a predetermined amount of heat for a predetermined period of time, and an additive system comprising a chemically inert salt which is soluble in the resin and a small amount of carbon blacks for increasing the dielectric loss factor of the composition without a significant increase in viscosity of the composition to accelerate the dielectric heating rate.

More specifically, the resin is chosen to be in combination with the present inventive composition based on several factors. The viscosity of the resin is critical. However, it must be recognized that a maximum resin viscosity can be affected by temperature as well as other environmental and chemical factors. Although a resin might be too viscous at room temperature, warming the resin to 500° C. might drop the viscosity sufficiently for the additive system to be effective. A preferred resin for use is diglycidyl ether of bisphenol A (DGEBA). Examples of DGEBA are Epon 825 and Epon 828 available from Shell Chemical Co.

Secondly, the particular curing agent utilized in the composition can affect the viscosity. Amine curing agents can be chosen that are relatively low viscosity liquids that lower the resin viscosity when they are added to the composition. Accordingly, although a resin might be too viscous alone, it might be of appropriate viscosity after the curing agent is added. In view of the above, the maximum recommended resin viscosity is 1000 centipoise. This viscosity corresponds to the resin system with a curing agent added and at a temperature from which the resin will be dielectrically heated. It has been found experimentally that for resins with higher viscosities, the increase in loss factor due to the additives was minimal.

Resins that already have a dielectric loss factor greater than 0.5 probably do not need any additives combined therewith because they are already lossy enough to heat quickly in a dielectric field. Most anhydride/epoxy resins fall into this category. An additional parameter is the dielectric frequency utilized. Because the dielectric heating rate is directly proportional to frequency, dielectric heating is generally limited to frequencies above 10 MHz. Preferably, and unless otherwise labeled, all dielectric data in support hereof was taken at 20 MHz, a frequency close to what will be used for various industrial applications.

Because all of the parameters involved in the dielectric loss factor are interdependent, concentration, viscosity, initial loss factor, frequency, etc. all are expected to affect the enhancement of the loss factor, and, therefore, no single factor can be isolated without taking into account the other factors.

Preferably, diamine curing agents are utilized. Specific examples of diamine curing agents are isophorone diamine (IPD) and 1,2-diaminocyclohexane (DACH).

Whereas the curing agent reacts chemically with the thermosetting resin to structurally alter the resin to effect cure, the chemically inert salt additive in my novel additive system is soluble in the resin but chemically inert. The additive system containing salt and a small amount of carbon blacks increases the dielectric loss factor of the composition without a significant increase in viscosity of the composition thereby accelerating the dielectric heating rate. More specifically, my novel additive system was unexpectedly found to increase the dielectric loss factor of epoxy resins beyond that of each component of the salt and the carbon blacks. Specific anionic quaternary ammonium salts that have been found to be effective are tetrabutylammonium tetrafluoroborate (TBAFB), tetrabutylammonium bromide (TBAB), tetrabutylammonium chloride and tetrabutylammonium iodide (TBAI). Specific cationic quaternary ammonium salts that have been found to be effective are tetraethylammonium bromide (TEAB), tetrapropylammonium bromide (TPAB), and tetrahexylammonium bromide. Other quaternary ammonium (TBA) salts are expected to behave similarly.

The carbon blacks used in my novel additive system were Printex ® XE2 and Vulcan ® XC-72 conductive carbon blacks commercially available from Degussa Company and Cabot Corp., respectively. It has the following properties and characteristics, 180 m$^2$/g surface area; 290Å particle size; 178 ml/100 g pore volume; and 1.0% volatiles.

The preferred concentration range of the carbon blacks is between 0.25% to 1% by weight. At concentrations higher than 1% by weight, the epoxy resin becomes too viscous to be used in a filament winding process.

The preferred concentration range of the quaternary ammonium salts is 0.01 to 0.10 moles/liter. Higher concentrations are expected to provide additional gains in loss factor, but for dielectric heating applications, this gain is presently unnecessary.

The present invention further provides a method of preparing a heat curable resin composition including the steps of mixing the thermosetting resin and curing agent which chemically reacts with the resin for curing the resin upon the application of a predetermined amount of heat for a predetermined period of time. The additive system is mixed into the resin and increases the dielectric loss factor of the composition without significantly increasing the viscosity of the composition. The composition is then dielectrically heat cured at an accelerated rate which is faster than the rate of curing the mixture of the resin and curing agent alone. Critical to the method is the dissolution of the chemically inert salt in the resin in combination with the salt being chemically inert except to the extent that it increases the dielectric loss factor of the composition.

More specifically, relatively low concentrations of TBA salts and carbon blacks are dissolved and mixed in epoxy resins for the purpose of increasing the resin's dielectric loss factor at radio frequencies. This method facilitates the dielectric curing process for the epoxy resins with amine-based curing agents. Without the TBA salt and carbon blacks, amine-cured epoxies have low dielectric loss factors at temperatures between 50° and 100° C. With the TBA salt and carbon blacks, amine cured epoxies can be heated rapidly in dielectric molds.

To demonstrate the effect of TBA salts and carbon blacks on the loss factor of resins, a 0.5% solution (by weight) of TBAB alone and a 0.5% carbon blacks alone in diglycidyl ether of bisphenol A (DGEBA) was prepared and dielectric loss factors as a function of temperature and frequency were measured. The results of the experiment are shown in FIG. 1. These loss factors are compared to those for DGEBA resin containing both additives, i.e., 0.5% salt and 0.5% carbon blacks. The graphs in FIG. 1 show that at temperatures between 20° and 120° C., the loss factors are increased significantly by the addition of my novel additive system.

Figure 2:
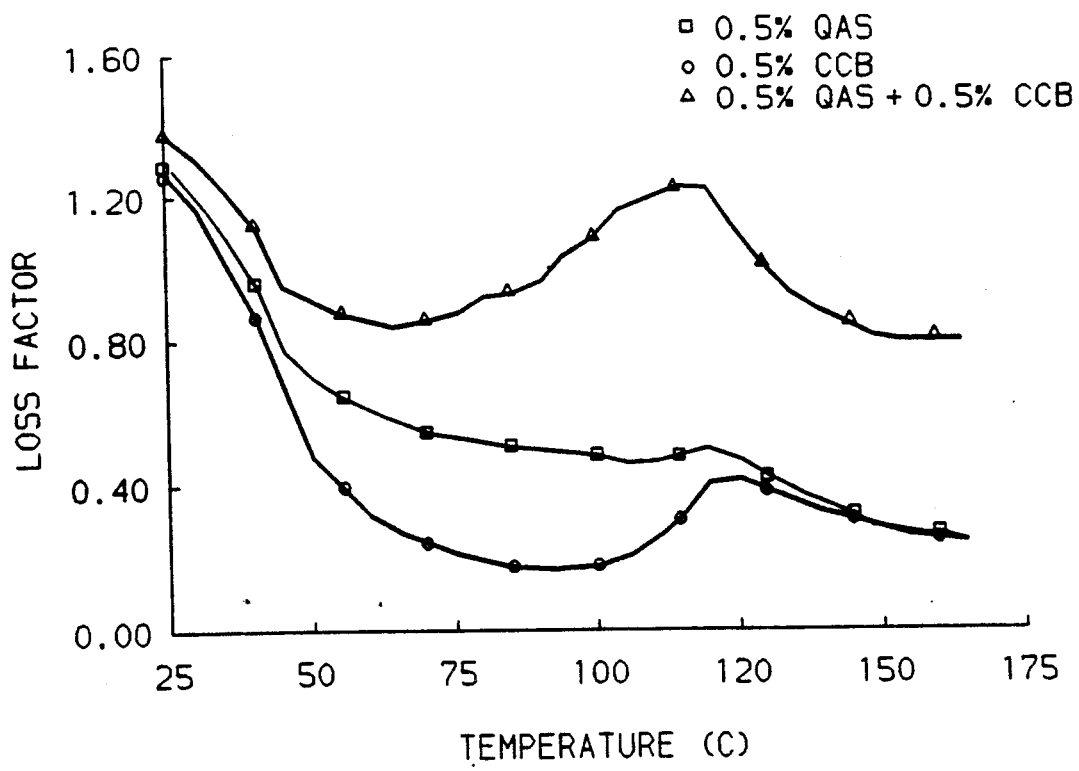
FIG. 2 is a compilation of graphs of loss factor curves for a DGEBA resin with curing agent with the carbon blacks alone, with the quaternary ammonium salt alone, and with the additive system.

Measurements of dielectric loss factors of the epoxy resin systems were also made with the curing agent. In FIG. 2, loss factor curves are presented as a function of temperature for three DGEBA epoxy resins with isophorone diamine as the curing agent. One resin contained 0.5% by weight of a quaternary ammonium salt, another contained 0.5% by weight of carbon blacks, and the final resin contained 0.5% of both quaternary ammonium salt and carbon blacks. The dielectric loss factor (at 20 MHz) of each resin was measured at one minute intervals while the resin was heated at a rate of 5° C./minute. This ramped temperature profile was used to demonstrate that the combined additive system yields a significantly higher loss factor than either additive alone over a wide range of resin temperatures and viscosities. While the largest loss factor gains occur when the resin is at its minimum viscosity (approximately 115° C.), a significant finding is the large increase still remaining after cure is complete (approximately 165° C.). This permanent increase in loss factor of the cured resin found with the combined additive system is in dramatic contrast to the temporary loss factor increase caused by using quaternary ammonium salts alone. The addition of my novel additive system clearly shows a synergistic effect over that where an individual additive was used.

Figure 3:
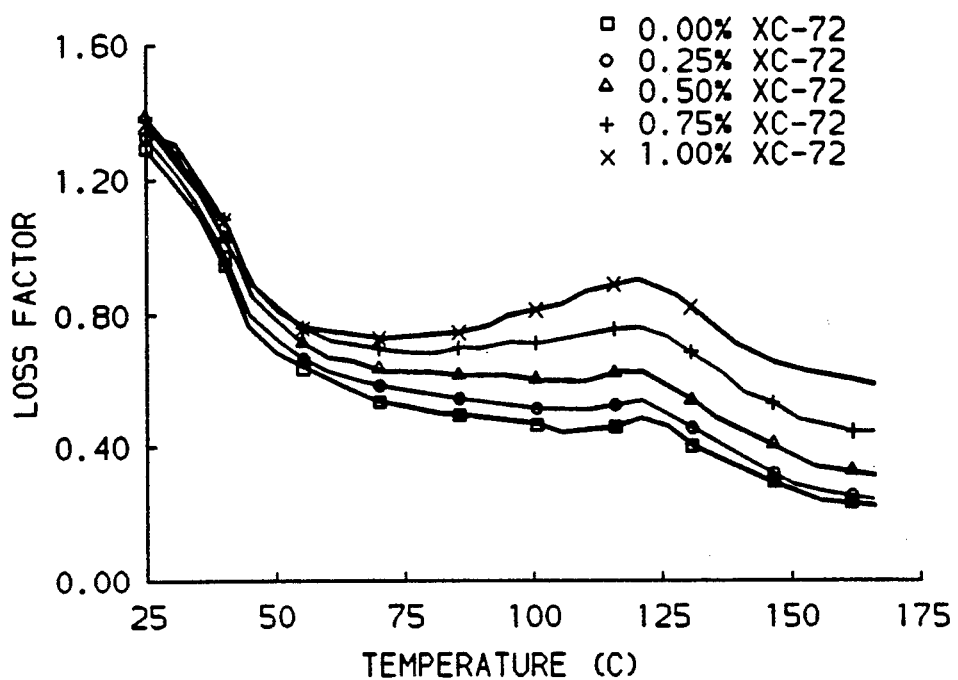
FIG. 3 is a graph of loss factor versus temperature for a DGEBA resin with curing agent, 0.5% quaternary ammonium salt, and varying amount of carbon blacks between 0% to 1%.

The effect of varying the concentration of carbon black at a fixed concentration (0.5%) of quaternary ammonium salt was investigated with a similar ramped temperature experiment as described above. As shown in FIG. 3, the synergistic effect of the combination of QAS and carbon black additives was found for the entire range of carbon black concentrations ranging from 0.25% to 1.0%. In all cases, the dielectric loss factor (at 20 MHz) was significantly higher than would be expected based on simple additivity of effects of the individual additives. The gain in loss factor increased consistently with increasing carbon black concentration without any apparent saturation effects so it is expected that even higher loadings of carbon black would behave similarly.

Figure 4:
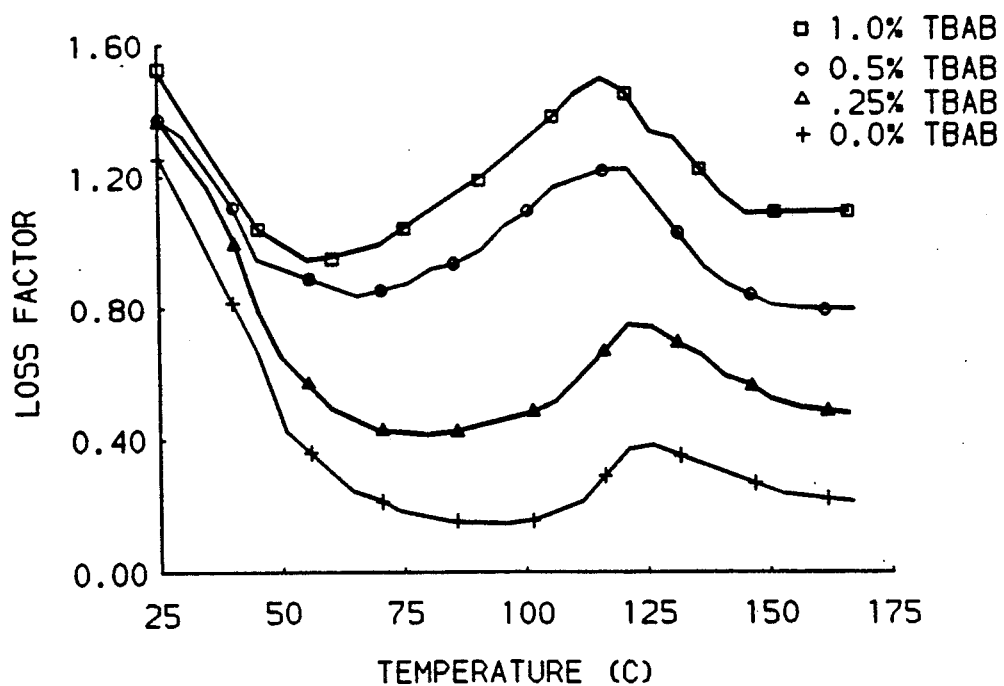
FIG. 4 is a graph of loss factor versus temperature for a DGEBA resin with curing agent, 0.5% carbon black, and varying amount of quaternary ammonium salt between 0% to 1%.

The effect of varying the concentration of quaternary ammonium salt at a fixed concentration (0.5%) of carbon black was also investigated. Once again, isophorone diamine was used as the curing agent and a 5° C./min temperature profile was followed. As can be seen in FIG. 4, increasing the concentration of QAS up to 1.0% results in a corresponding increase in the dielectric loss factor at 20 MHz. Without the 0.5% carbon black in these epoxy solutions, increasing the concentration of QAS would result in a higher loss factor over the 50° to 125° C. temperature range but after cure (above 150° C.) all the loss factor curves would converge to a common point. With the 0.5% carbon black, however, the loss factor curves show large loss factor differences even after the resin system has cured. This distinction highlights the synergism obtained by using both carbon black and QAS together as an additive package.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A heat-curable epoxy resin composition having a high dielectric loss factor for dielectric curing consisting essentially of a liquid diglycidyl ether of bisphenol A, a liquid amine curing agent for said bisphenol A, 0.25 percent to 1 percent by weight of the total composition of one or more quaternary ammonium salts selected from the group consisting of tetraalkylammonium halide salts and tetraalkylammonium tetrafluoroborate salts, and 0.25 percent to 1 percent by weight of the total composition of carbon black, said composition having a maximum viscosity of 1000 cp at the temperature from which the resin will be dielectrically heated for curing.

2. A composition as set forth in claim 1 wherein said quaternary ammonium salt is a tetrabutylammonium salt.

3. A composition as set forth in claim 2 wherein said quaternary ammonium salt is selected from the group essentially consisting of tetrabutylammonium tetrafluoroborate, tetrabutylammonium bromide, and tetrabutylammonium iodide.

4. A heat-curable epoxy resin composition as recited in claim 1 wherein said amine curing agent is an amine selected from the group consisting of isophorone diamine and 1,2-diaminocyclohexane.

* * * * *